Sept. 23, 1969    D. L. SHORTLIDGE    3,469,138
BRUSH HOLDING MEANS FOR ELECTRIC MOTOR
Filed Feb. 16, 1968
FIG. 1
FIG. 2
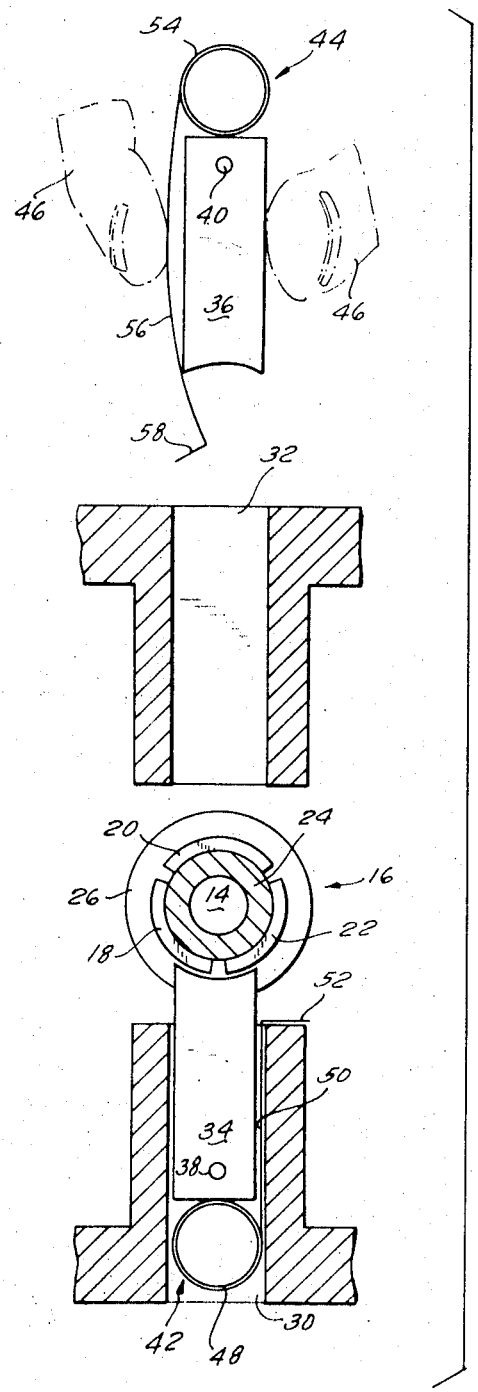
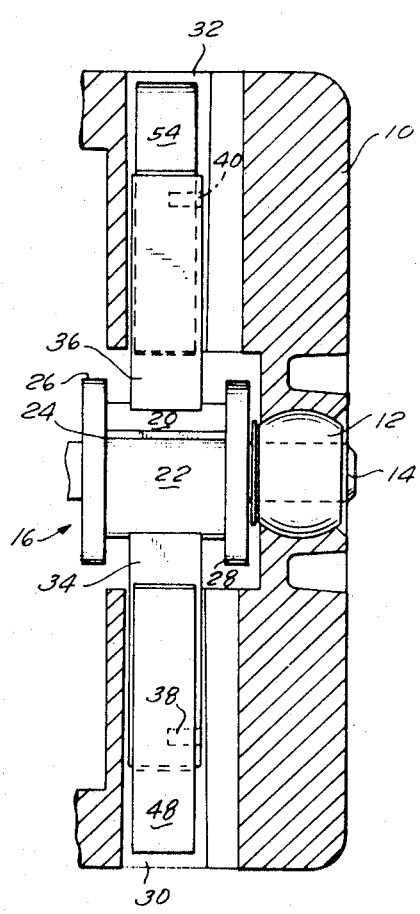
INVENTOR
DONALD L. SHORTLIDGE
BY
ATTORNEYS United States Patent Office 3,469,138
Patented Sept. 23, 1969

3,469,138
BRUSH HOLDING MEANS FOR ELECTRIC MOTOR
Donald L. Shortlidge, Lancaster, Pa., assignor to Schick Electric Inc., Lancaster, Pa., a corporation of Delaware
Filed Feb. 16, 1968, Ser. No. 706,110
Int. Cl. H02k *13/10;* H01r *39/40*
U.S. Cl. 310—246     6 Claims

ABSTRACT OF THE DISCLOSURE

A commutator brush holding means wherein the coiled portion of a partially unwound coil spring having an end anchored to the motor housing presses the brush toward the commutator and the unwound portion of the spring maintains the brush against the housing and substantially free of vibration.

BACKGROUND OF THE INVENTION

Proper brush mounting is one of the most important requisites in achieving proper motor commutation. Brushes must contact the commutator with a substantially constant pressure. If the pressure is too high there results excessive brush and commutator wear which reduces motor efficiency. If the pressure is too low there is poor operation, improper commutation and sparking. In the design of electric motors and especially small motors wherein brushes are used, the brushes are usually urged against the commutator by conventional springs, compression, torsion or cantilever. As all of these springs conform to Hook's law, the pressure varies with the length of depression as well as the length of the brush. In designing, the designer usually seeks a spring design with the flattest possible gradient and then designs for medium wear, anticipating excessive brush wear and power loss when the brush is new and reduced commutation when the brush is worn below its mean length. In other words, a compromise must be made.

In the subject invention a spring having a flat rectangular cross-section and in the configuration of a partially unwound coil which is yieldingly attempting to return to its wound condition is utilized. The spring provides a coiled portion and an uncoiled portion. The design provides that the uncoiled portion of the spring be provided with a hook or means for engaging the motor housing and the coiled portion applies pressure against the top of the brush. The normal curvature of the spring against the side of the brush insures proper and constant brush seating against the brush guiding channel in the motor housing. Thus, dampened retention of the spring reduces brush bounce and substantially eliminates vibration. With such a design there is no necessity for additional brackets or metal parts which have to be anchored in the motor housing and to which the spring must be riveted, staked or spot welded as appears in the prior art.

SUMMARY OF THE INVENTION

A commutator brush holding means for an electric motor including a brush channel open at the end adjacent the commutator with a brush disposed therein and a spring having a flat rectangular cross-section and in the configuration of a partially unwound coil which is yieldingly attempting to return to its wound condition providing a coiled portion and an uncoiled portion disposed in the channel with the uncoiled portion urging the brush against the side of the channel to substantially eliminate vibration and the coiled portion urging the brush against the commutator, with a hook portion formed on the end of the uncoiled portion anchored to the motor housing.

DESCRIPTION OF THE DRAWINGS

In the accompanying drawings:
FIG. 1 is a partially exploded front view of a commutator brush holding means constructed in accordance with this invention illustrating one brush of a pair in position in the brush holding means and a second brush in the process of being inserted; and
FIG. 2 is a segmentary side view of a commutator engaged by brushes mounted in accordance with this invention.

DESCRIPTION OF THE PREFERRED EMBODIMENTS

In the figures an end bell 10 mounts a self-aligning spherical bearing 12 which supports an end of motor shaft 14. A commutator 16 is mounted on shaft 14 consisting of segments 18, 20 and 22, body 24 and end flanges 26 and 28.

The end bell 10 contains rectangular elongated brush guiding channels 30 and 32 provided on the same longitudinal axis on either side of the commutator and each of which is open at its ends.

In FIG. 1 brush 34 is shown mounted within channel 30 while brush 36 is shown in the process of being inserted in channel 32. Brushes 34 and 36 are standard carbon brushes used in commutation, being square or rectangular in cross-section with the end adjacent the commutator arcuately formed to embrace segments thereof and the remaining end flat. Holes 38 and 40 are respectively formed in brushes 34 and 36 to allow for protrusion of the respective brush lead.

A spring is used in mounting each of the brushes. Hence, spring 42 is shown in channel 30 and spring 44 is shown held in the fingers 46 illustrated in FIG. 1 in the process of inserting brush 36 in channel 32. Springs 42 and 44 are identical. Each of the springs has a flat rectangular cross-section and is coiled so that when used in this invention the spring has the configuration of a partially unwound coil which is yieldingly attempting to return to its wound condition providing a coiled portion and an uncoiled portion. A hook portion or right angle projection or bend is formed on the end of the uncoiled portion. In the figures, the coiled portion, uncoiled portion and hook portion of coil 42 are respectively indicated by the numerals 48, 50 and 52, while the coiled portion, uncoiled portion and hook portion of coil 44 are respectively indicated by the numerals 54, 56 and 58.

The method of inserting the brush and spring in the brush guide channel is illustrated in FIG. 1 with respect to brush 36. The coiled portion of the spring is set in position behind the brush and the finger held on brush end uncoiled portion. After inserting the brush and spring the leg or foot 58 of the spring slides into place and the motor brush is loaded. The coil portion of the spring is on the axis of the brush which is in the plane of the axis of the commutator. It is seen that no back-up plate is required for supporting the spring and no electric welding or riveting is required. Additionally, and perhaps the most important, constant pressure of the brush on the commutator is maintained over the life of the brush. The springs are arranged on opposite walls as shown in FIG. 1 at each brush to compensate for possible brush displacement caused by the rotational drag of the armature.

I claim:
1. A commutator brush holding means for an electric motor including in combination a motor end bell, an elongated channel formed in said end bell, said channel being formed with an open end adjacent said commutator, said brush disposed within said channel, a spring having a flat rectangular cross-section and in the configuration of a partially unwound coil which is yieldingly attempting to return to its wound condition providing a coiled portion and an uncoiled portion, a hook portion formed on the end of said uncoiled portion, said spring being disposed within said channel with said hook portion engaging said end bell, said uncoiled portion in contact with said brush and yieldingly urging said brush against the side of said channel and said coiled portion in contact with said brush and yieldingly urging said brush against said commutator through said open end.

2. A commutator brush holding means in accordance with claim 1 in which the center of said uncoiled portion is on the longitudinal axis of said brush.

3. A commutator brush holding means in accordance with claim 1 in which the center line of said uncoiled portion and the axis of said commutator lie on the longitudinal axis of said brush.

4. A commutator brush holding means in accordance with claim 1 in which said hook portion is an angular bend in said uncoiled portion.

5. A commutator brush holding means in accordance with claim 1 in which said hook portion is an angular bend in said uncoiled portion and is without said channel and embraces a portion of said end bell adjacent said open end.

6. A commutator brush holding means in accordance with claim 1 in which said uncoiled portion is adjacent a side of said end channel in the direction of rotation of said commutator and a second brush is provided and maintained in a second channel by a second like spring having the uncoiled portion thereof lying adjacent the side of said second channel in the direction of rotation of said commutator.

References Cited

UNITED STATES PATENTS

| 2,695,968 | 11/1954 | Welch et al. | 310—246 |
| 2,836,745 | 5/1958 | Gillie | 310—246 |
| 8,851,622 | 9/1958 | Hall | 310—246 |
| 2,862,124 | 11/1958 | Huber | 310—246 |
| 3,133,218 | 5/1964 | Harris | 310—246 |

MILTON O. HIRSHFELD, Primary Examiner

L. L. SMITH, Assistant Examiner

U.S. Cl. X.R.

310—242